United States Patent
Wang et al.

(10) Patent No.: US 10,867,167 B2
(45) Date of Patent: Dec. 15, 2020

(54) COLLABORATIVE DEEP NETWORK MODEL METHOD FOR PEDESTRIAN DETECTION

(71) Applicant: Peking University Shenzhen Graduate School, Shenzhen (CN)

(72) Inventors: Wenmin Wang, Shenzhen (CN); Hongmeng Song, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Hui Zhao, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 18 days.

(21) Appl. No.: 16/466,386

(22) PCT Filed: Jul. 24, 2017

(86) PCT No.: PCT/CN2017/094016
§ 371 (c)(1),
(2) Date: Jun. 4, 2019

(87) PCT Pub. No.: WO2018/107760
PCT Pub. Date: Jun. 21, 2018

(65) Prior Publication Data
US 2020/0082165 A1   Mar. 12, 2020

(30) Foreign Application Priority Data
Dec. 16, 2016 (CN) .......................... 2016 1 1166903

(51) Int. Cl.
G06K 9/00 (2006.01)
G06K 9/62 (2006.01)
G06N 3/04 (2006.01)

(52) U.S. Cl.
CPC ....... *G06K 9/00362* (2013.01); *G06K 9/6223* (2013.01); *G06K 9/6267* (2013.01); *G06N 3/0454* (2013.01)

(58) Field of Classification Search
CPC .................................................. G06K 9/00288
See application file for complete search history.

(56) References Cited

U.S. PATENT DOCUMENTS 6,778,705 B2 * 8/2004 Gutta ................... G06K 9/6273
382/190
7,308,133 B2 * 12/2007 Gutta ................ G06K 9/00288
382/159

(Continued)

*Primary Examiner* — Cindy Trandai
(74) *Attorney, Agent, or Firm* — SV Patent Service

(57) ABSTRACT

A Collaborative Deep Network model method for pedestrian detection includes constructing a new collaborative multi-model learning framework to complete a classification process during pedestrian detection; and using an artificial neuron network to integrate judgment results of sub-classifiers in a collaborative model, and training the network by means of the method for machine learning, so that information fed back by sub-classifiers can be more effectively synthesized. A re-sampling method based on a K-means clustering algorithm can enhance the classification effect of each classifier in the collaborative model, and thus improves the overall classification effect. By building a collaborative deep network model, different types of training data sets obtained using a clustering algorithm are used for training a plurality of deep network models in parallel, and then classification results, on deep network models, of an original data set are integrated and comprehensively analyzed, which achieves more accurate sample classification.

9 Claims, 2 Drawing Sheets

(56) References Cited

U.S. PATENT DOCUMENTS

| | | | | |
|---|---|---|---|---|
| 2006/0083423 | A1* | 4/2006 | Brown | G06K 9/00362 |
| | | | | 382/159 |
| 2014/0334719 | A1* | 11/2014 | Takenaka | G06K 9/00369 |
| | | | | 382/159 |
| 2015/0310365 | A1* | 10/2015 | Li | G06K 9/00771 |
| | | | | 705/7.38 |
| 2015/0350608 | A1* | 12/2015 | Winter | G06T 7/20 |
| | | | | 382/103 |
| 2016/0026915 | A1* | 1/2016 | Delp | G05B 23/0229 |
| | | | | 706/20 |
| 2017/0011294 | A1* | 1/2017 | Jagannathan | G06F 9/3887 |
| 2017/0076474 | A1* | 3/2017 | Fu | G06K 9/00268 |
| 2017/0124400 | A1* | 5/2017 | Yehezkel Rohekar | G06K 9/52 |
| 2017/0132526 | A1* | 5/2017 | Cohen | G06N 3/0454 |
| 2017/0371340 | A1* | 12/2017 | Cohen | G06T 7/73 |
| 2017/0372193 | A1* | 12/2017 | Mailhe | G06N 3/0472 |
| 2018/0032796 | A1* | 2/2018 | Kuharenko | G06F 16/5838 |
| 2018/0032845 | A1* | 2/2018 | Polak | G06K 9/4604 |
| 2018/0075306 | A1* | 3/2018 | Mehrseresht | G06K 9/00348 |
| 2018/0144214 | A1* | 5/2018 | Hsieh | G06N 3/08 |
| 2019/0164538 | A1* | 5/2019 | Seo | G10L 15/285 |

* cited by examiner

COLLABORATIVE DEEP NETWORK MODEL METHOD FOR PEDESTRIAN DETECTION

TECHNICAL FIELD

The present invention relates to the field of information technology and digital file content protection technology, and specifically, to a collaborative deep network model method for pedestrian detection.

BACKGROUND OF THE INVENTION

For both natural and social science research, human beings have always been the most important concern. Therefore, using of computers to analyze human activities has always been the hottest research topic in the field of computer vision. The analysis of intelligent behaviors such as human motion recognition and event detection shall be based on fast and accurate pedestrian detection. Therefore, the research on pedestrian detection technology has been widely concerned by academics and industry, featuring profound significance for the development of modern video surveillance, intelligent robots and unmanned system technology. In general, pedestrian detection refers to judging whether a given image or a video frame contains pedestrians, and marks the positions of the pedestrians if it contains pedestrians. Thus, it can be divided into two parts: classification and positioning of the sample, wherein fast and accurate sample classification is the premise and key of pedestrian detection technology.

The existing pedestrian detection technology is relatively mature, and its basic framework is derived from the HOG+SVM model. The classification of pedestrian samples is roughly divided into five key steps: sample collection (candidate frame extraction), preprocessing, feature extraction, classifier training and testing. Feature extraction and classifier training are the key factors affecting detection performance. According to the number of classifiers used in the classification process, the pedestrian detection algorithm can be divided into a single classifier model algorithm and a multi-classifier model algorithm. In the single classifier model algorithm, artificial feature-based detection algorithm and deep learning-based detection algorithm are dominant. The former first extracts features from the image by manual definition, including HOG features, LBP features, ACF, etc., and then inputs them into a common classifier for training. Finally, the trained model is used to distinguish between pedestrian and non-pedestrian samples. Later, the new deep learning algorithm greatly improved the accuracy of feature extraction and the detection performance of classifiers, but was still limited by the limitations of single classifiers in feature learning ability, and the results did not reach the ideal level. The second type of algorithm breaks through the bottleneck of the single classifier model, using a plurality of classifiers to learn sample features and integrate the classification results, so as to realize more accurate sample classification, such as the common component model-based classification algorithm, cascading model, and ensemble model. Component-based model often starts from various components of the sample, extracts local features, trains local classifiers, and finally integrates and analyzes them. For occluded samples, the useful contour features can be well learned, which greatly improves the detection performance; and the cascading model uses the idea of Boosting to arrange a plurality of classifiers sequentially, and then trains these classifiers one by one with different samples, so that they have different classification capabilities, and the latter classifier is designed according to the classification results of previous classifier. All the weak classifiers in the final cascade form a strong classifier, which improves the performance of the detection algorithm from the perspective of complementarity of the classifier; and the ensemble model is rare in the multi-classifier model, and has not yet been concerned and used in the field of pedestrian detection. It integrates a plurality of classifiers in parallel, allowing all sub-classifiers to work together to make the final decision, which is similar to the decision-making method in which human society collaborates. The ensemble model that has been successfully verified and applied in the field of pedestrian detection is only the integrated CNN (Convolutional Neural Network) model, which trains a plurality of CNN models in parallel, then inputs each sample into each CNN model, and finally takes the maximum, minimum, or average of the scores of the output as the final classification result for the sample. The specific process of the classification algorithm based on the integrated CNN model comprises:

Step 1) preparing the training data set, and extracting the multi-scale pedestrian and non-pedestrian candidate frames from the original data set by the sliding window method;

Step 2) inputting each sample sequentially into the CNN for convolution and pooling calculation to obtain a feature map;

Step 3) setting the fully connected layer with different dropout ratios, and then inputting the feature map extracted from the original sample to train different CNN models; and Step 4) inputting the test data set sequentially into the trained model for classification of pedestrian samples. Each sample obtains several detection scores, and the maximum, minimum or average value of the scores is calculated as the final judgment score.

It can be seen that the above-mentioned original classification algorithm based on the integrated CNN model only integrates the CNN model. This model is more scientific than the component-based model and the cascading model, and can solve the pedestrian deformation and occlusion problems. However, it has drawbacks in the integration method, and does not have generality and theoretical basis, and the sample classification is not accurate enough.

SUMMARY OF THE INVENTION

In order to overcome the above deficiencies of the prior art, a Collaborative Deep Network (CDN) method for pedestrian detection is disclosed in the present invention. It mainly aims at the classification process in the pedestrian detection technology. A Collaborative Deep Network (CDN) model method is designed. Different types of training data sets obtained by K-means clustering algorithm are used for training a plurality of deep network models in parallel, and then classification results, on deep network models, of an original data set are integrated and comprehensively analyzed by means of the artificial neural network, so as to realize more accurate sample classification, which can be used for pedestrian sample classification in pedestrian detection.

The principle of the invention is as follows. The invention improves the classification algorithm based on the integrated CNN model. The idea of the classification algorithm based on the integrated CNN model is to construct a plurality of different CNN networks by using different nodes of the dropout in the full connection layer; and train each CNN network by using samples. Finally, the maximum, minimum, and average values of each network's output are used to complete the classification. The invention adopts a collaborative working mode of human society, first training a plurality of different deep network models as members in parallel, and then training an artificial neural network similar to the decision maker to learn the classification results information of each sample in the data set in each sub-classifier, so that it can learn to analyze this information comprehensively and come to more accurate conclusions. At the same time, in order to enhance the ability of each member of the team, that is, the classification effect of each sub-classifier, and thus improve the classification ability of the entire classification model, the present invention also proposes a re-sampling method based on a K-means clustering algorithm, in which the candidate sample frames extracted from the original data set are clustered according to certain characteristics, different types of pedestrian samples and non-pedestrian samples are obtained, and then they are input into different detection models for learning, so that the classifier can learn more concentrated sample characteristics. It should be noted that the present invention actually provides a new ensemble model framework, using a variety of deep network models, wherein the better the effect of the deep network model used is, the more significant the integration effect is. In summary, the cooperative deep network model method adopted by the present invention can integrate a plurality of different types of deep network models, and use an artificial neural network to replace the existing original algorithm which calculates the maximum, minimum or average values to integrate classification results on different deep network models. In order to improve the classification ability of each sub-deep network, a re-sampling technology based on K-means clustering algorithm is designed so as to realize more accurate pedestrian classification.

The technical scheme proposed in the present invention:

A Collaborative Deep Network (CDN) model method for pedestrian detection includes building a Collaborative Deep Network model, and training a plurality of deep network models in parallel by using different types of training data sets obtained by means of a clustering algorithm. Then classification results of an original data set, from the deep network models, are integrated and comprehensively analyzed by means of the artificial neural network, so as to realize more accurate sample classification; comprising the steps of:

Step 1) using a re-sampling method based on a K-means clustering algorithm, and dividing the original training sample data set into different sub-sample sets by different features;

Step 2) selecting a plurality of deep network models as sub-classifiers, and training the plurality of deep network models in parallel by using the sub-sample sets to obtain a plurality of trained sub-classifiers;

Step 3) inputting the original training sample data set into the plurality of trained sub-classifiers at the same time to obtain detection scores, connecting the detection scores into detection score vectors, and training an artificial neural network by using the detection score vectors, to get a trained Collaborative Deep Network model; and Step 4) inputting the test data set into the trained Collaborative Deep Network model to classify the pedestrian samples, and obtaining the pedestrian sample classification.

For the Collaborative Deep Network model method, further, in Step 1), the re-sampling method based on a K-means clustering algorithm uses the K-means clustering algorithm to automatically segment the original training sample data set, to obtain a plurality of training sub-sample sets with different features by re-sampling, so that the differences between the training sub-sample sets are large and the differences within the training sub-sample sets are small; comprising the steps of:

Step 11) extracting the feature vector $X=\{x_i\}_{i=1}^{n}$, for each sample in the original training sample data set D, wherein n is the total number of samples;

Step 12) randomly selecting the feature vector of k samples as the cluster center, and recording as $\{c_j\}_{j=1}^{k}$;

Step 13) calculating the distance $d_{ij}$ between each feature vector and each cluster center by Equation 1:

$$d_{ij}=\|x_i-c_j\|_2 \quad (1)$$

In Equation 1, $x_i$ is the feature vector of each sample in the original training sample set D; and $c_j$ is the cluster center;

Step 14) for each feature vector $x_i$, according to its distance from each cluster center, classifying the feature vector to the class in which the center vector closest to each other is located;

Step 15) updating the center vector of each class by Equation 2:

$$c_j = \frac{1}{|C_j|}\sum_{i \in C_j} x_i \quad (2)$$

$$C_j = \{i \mid \forall\, m \neq j,\, d_{im} > d_{ij}\}$$

where $C_j$ represents labels of all samples contained in each class; and

Step 16) stopping the clustering process when $C_j$ no longer changes, and getting different sub-sample sets; otherwise return to Step 13).

For the Collaborative Deep Network model method, further, the feature vector has a three-channel feature, each sample corresponds to three feature vectors, and the original training sample is clustered with each feature vector of the three channels respectively; and the model initialization value of the classification number k in Step 12) is set as 2, indicating that the corresponding sample contains attributes of both pedestrian and non-pedestrian.

For the Collaborative Deep Network model method, further, in Step 2), the deep network model as the sub-classifier can include a basic deep network model, a strong deep learning detector, and a strong deep learning detector trained with weak training samples. The basic deep network model can include a convolutional neuron network model and a perceptron model; the strong deep learning detector can include a United Deep Model.

For the above Collaborative Deep Network model method, further, in Step 3), the feed forward model of the artificial neural network is Equation 3:

$$net_j = \sum_{i=1}^{i=n} w_{ij}x_i + b_j,\, j=1,2,\ldots,m \quad (3)$$

$$y_j = f(net_j),\, j=1,2,\ldots,m$$

where $x_i$ represents the value of the i-th node of the input layer, $w_{ij}$ represents the connection weight from the i-th node of the input layer to the j-th node of the output layer, n is the number of nodes of the input layer, and $b_j$ represents the offset of the j-th node of the output layer;

The artificial neural network can be trained by using a backpropagation algorithm.

For the Collaborative Deep Network model method, further, in Step 2), the United Deep Model can be chosen as a sub-classifier, and the original training sample data set adopts the original image in the Caltech pedestrian database and the ETH pedestrian database. The training process for this sub-classifier can include the following steps:

In the first step, transforming the original image into the YUV color space first, and extracting three-channel features;

In the second step, inputting the obtained three-channel feature into the United Deep Model, and making two convolution transformations and one pooling operation for the input three-channel feature to obtain a plurality of component detection maps;

In the third step, deforming the detection map of the component by Equation 4, and calculating the scores $s_p$ of all components:

$$B_p = M_p + \sum_{n=1}^{N} c_{np} D_{np}$$

$$s_p = \max_{(x,y)} b_p^{(x,y)}$$

(4)

where $M_p$ represents the detection map of the p-th component; $D_{np}$ and $c_{np}$ represent the n-th deformation map corresponding to the p-th component and its weigh; and $b_p^{(x,y)}$ corresponds to the element at position (x, y) in $B_p$; and In the fourth step, forming the scores of all components into the score vector of the component s by Equation 5:

$$s = (s_p)_{p=1}^{20}$$

(5)

The scoring vector of the components is used to train the visual reasoning and classification network, then training of the above sub-classifier is completed, and the trained sub-classifier is obtained.

In the above training process, for the three-channel features in the first step, wherein the first channel feature corresponds to the Y channel feature of the original image; the second channel feature is divided into four parts: an upper left corner, an upper right corner, a lower left corner, and a lower right corner. The upper left corner, the upper right corner, and the lower left corner respectively correspond to the feature maps of the Y, U, and V channels of the original image whose size is reduced to half of the original image, and the lower right corner is filled with 0; the third channel feature is also divided into four parts, reflecting the edge information of the original picture; the upper left corner, the upper right corner, and the lower left corner are the edge maps obtained by transforming the feature maps of the Y, U, and V channels of the original image through the Sobel operator and scaling the size. The lower right corner is composed of the pixel values having the largest amplitude at each of the above three edge maps. In the embodiment of the present invention, twenty convolution kernels are used in the second step to calculate the detection maps of 20 components, which are feature maps of the components. The deformation map used in the third step is a two-dimensional matrix of the same size as the detection map of the component, and the values in each matrix are between 0 and 255.

Compared with conventional technologies, the beneficial effects of the present invention are as follows:

Subject to the limitation of the classification algorithm used in the existing pedestrian detection technology in the field of pedestrian detection in computer vision, a new Collaborative Deep Network model algorithm is proposed in the present invention. The K-means clustering algorithm firstly separates different types of training sub-data sets from the original data set, and then uses these data sets to train a plurality of deep network models in parallel. Finally, the classification results, on the trained deep network model, of all the samples are integrated and comprehensively analyzed by means of the artificial neural network, so as to realize more accurate sample classification. The present invention has a better effect on a plurality of experimental data sets than other algorithms.

Compared with the conventional technologies, the major advantages of the present invention are reflected in the following aspects:

(1) A new collaborative multi-model learning framework is constructed to complete the classification process in pedestrian detection. Several different deep network models are trained in parallel within the framework. Finally, the classification results of network models are integrated to make decisions together. The limitations of single classifiers in feature extraction and feature learning are avoided.

Constructing a new collaborative multi-model learning framework is basically not considered in the existing pedestrian detection technology. The collaborative classification model of a plurality of deep network models provided in the present invention can effectively compensate the limitations of single depth models in feature extraction and feature learning. Especially, for pedestrian samples with more severe deformation and occlusion, it can make full use of the features of each classifier and eliminate detection errors, thus achieving more accurate pedestrian detection.

(2) It is proposed to integrate the judgment results, in the collaborative model, of each sub-classifier by means of the artificial neural network, and to train the network by means of machine learning, so as to more effectively synthesize the information fed back by each classifier.

The strategy of integrating each deep network in the collaborative model by means of the artificial neural network is closer to the decision-making method of human brain than the existing manual rules such as averaging or taking the maximum value, which is more scientific and can achieve better detection results.

(3) A re-sampling technology based on a K-means clustering algorithm is proposed. Firstly, the candidate sample frames extracted from the original data set are clustered according to certain features to obtain different types of pedestrian samples and non-pedestrian samples, to train different detection models. With the re-sampling of samples based on a K-means clustering algorithm, each sub-classifier can learn different and more concentrated pedestrian features, so that each classifier can learn more specific sample features, to enhance the classification ability of a certain type of samples, enhance the classification effect of each classifier in the collaborative model, and thus improve the overall classification effect.

DETAILED DESCRIPTION OF THE INVENTION

The present invention will become apparent from the following detailed description of embodiments and from the accompanying drawings, but not limited to the scope of the invention in any way.

Figure 1:
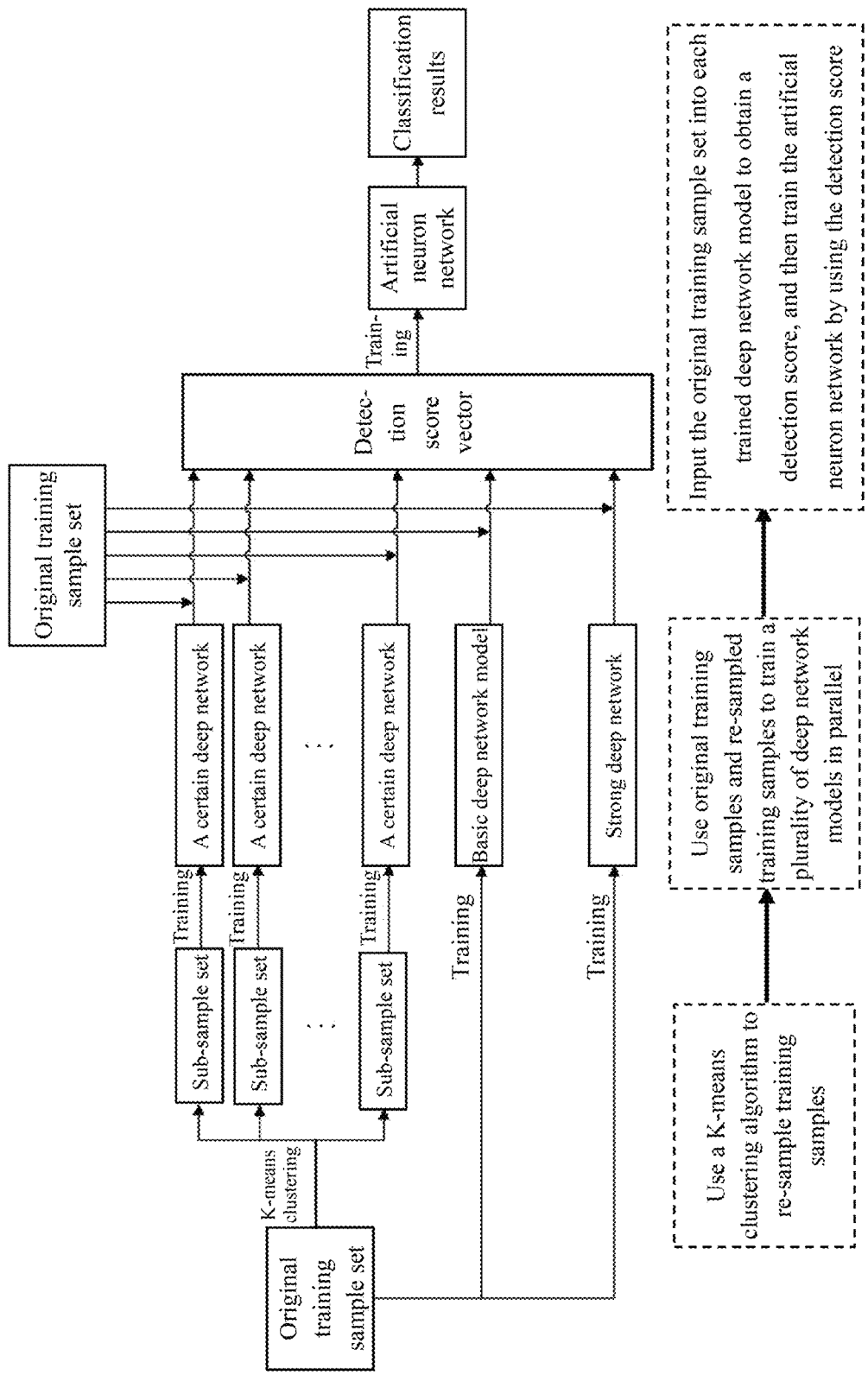
FIG. 1 illustrates a flowchart of a Collaborative Deep Network model method proposed in the present invention.

A Cooperative Deep Network (CDN) model algorithm for pedestrian detection is provided in the present invention, which is a sample classification method, and does not include candidate frame extraction and pedestrian positioning process in the pedestrian detection process; and mainly for the classification process in the pedestrian detection technology, a Collaborative Deep Network (CDN) model is designed. Different types of training data sets obtained by means of a clustering algorithm are used for training a plurality of deep network models in parallel, and then classification results, on deep network model, of an original data set are integrated and comprehensively analyzed by means of the artificial neural network, so as to realize more accurate sample classification, which can be used for pedestrian sample classification in pedestrian detection; and FIG. 1 illustrates a flowchart of a presently disclosed Collaborative Deep Network model method, comprising the following steps:

Step 1) using a re-sampling technology based on a K-means clustering algorithm to prepare the training sample data set, and dividing the original sample data set into different sub-sample sets according to different features;

Step 2) selecting a plurality of deep network models as sub-classifiers, and training them in parallel by using the original training sample set and the re-sampled sub-sample sets; Each of the deep network model is trained by using the training method of the original model itself;

Step 3) inputting the original sample data set simultaneously into a plurality of trained sub-classifiers to obtain detection scores, and then connecting these scores into a vector to train an artificial neural network, and to obtain a trained cooperative deep network model finally; and Step 4) inputting the test data set into the trained model for classification of pedestrian samples.

In Step 1), using a re-sampling technology based on a K-means clustering algorithm to prepare the training sample data set, that is, using the K-means clustering algorithm to automatically segment the original sample data set, and re-sampling to obtain a plurality of training sub-sample sets with different features, so that the differences between different sample sets are large and the differences within the sample set are small, which enables a plurality of deep networks to learn different but more concentrated types of features and enhance the ability to distinguish specific samples, comprising the steps of:

Step 11) extracting the feature vector $X=\{x_i\}_{i=1}^{n}$, for each sample in the original training sample data set D, wherein n is the total number of samples;

Step 12) randomly selecting the feature vector of k samples as the cluster center, and recording as $\{c_j\}_{j=1}^{k}$;

Step 13) calculating the distance d between each feature vector and each cluster center by Equation 1:

$$d_{ij}=\|x_i-c_j\|_2 \quad (1)$$

In Equation 1, $x_i$ is the feature vector of each sample in the original training sample set D; and $c_j$ is the cluster center;

Step 14) for each feature vector $x_i$, according to its distance from each cluster center, classifying the feature vector to the class in which the center vector closest to each other is located;

Step 15) updating the center vector of each class by Equation 2:

$$c_j = \frac{1}{|C_j|}\sum_{i\in C_j} x_i \quad (2)$$

$$C_j = \{i \mid \forall\, m \neq j,\, d_{im} > d_{ij}\}$$

where $C_j$ represents labels of all samples contained in each class; and

Step 16) stopping the clustering process when $C_j$ no longer changes, and getting different sub-sample sets; otherwise return to Step 13).

Since the feature vector extracted here has a three-channel feature, each sample should correspond to three feature vectors, and in the re-sampling process, the original training samples are separately clustered by each of the three channels. In addition, considering that the K-means algorithm needs to specify the number of classifications k in advance, k is initialized to 2 in this model, to correspond to the attributes of the sample that contain both pedestrians and non-pedestrians.

In Step 2), the training subsample set and the original data set obtained by the above clustering are used respectively to train a plurality of different deep network models, and the training process of each model is computed by multi-thread in parallel. The following three types of deep network models can be used here:

Step 2A) Basic deep network models, such as CNN and perceptron models, which have good feature learning and classification capabilities, but are not sufficient to complete pedestrian detection tasks in complex scenes where there are a large number of pedestrian deformations and occlusions. Therefore, cooperation with each other is required to better avoid the detection error of its own;

Step 2B) Strong deep learning detectors, such as the United Deep Model described above, which can detect pedestrians in the image more accurately and quickly than the basic deep network model, and have better countermeasures for complex scenes. The addition of a strong deep learning detector in CDN can effectively ensure the detection effect of the overall model and further improve the detection performance of the strong deep learning detector;

Step 2C) Strong deep learning detectors trained with weak training samples. These models are relatively special. They have strong classification ability, but they are trained with a certain type of training samples, and thus have superb ability to detect certain types of samples. By integrating classifiers with the ability to detect different types of samples, the CDN model will have more comprehensive detection capabilities than the common multi-model integration.

In Step 3), after obtaining a plurality of trained deep network models, various samples in the original training data set are simultaneously input into the deep models for classification and identification, and several detection scores are obtained (the detection scores for the classification are obtained for each deep network model). These output scores are composed into vectors as the observation information of each sample to train an artificial neural network and obtain a collaborative classification model, that is, a Collaborative Deep Network model, in which a plurality of different deep network sub-classifies are embedded, which can effectively use this information to complete more accurate pedestrian detection tasks after comprehensively learning the preliminary classification information of each sample. The feed forward model of the artificial neural network is Equation 3:

$$net_j = \sum_{i=1}^{i=n} w_{ij}x_i + b_j, j = 1, 2, \ldots, m \quad (3)$$

$$y_j = f(net_j), j = 1, 2, \ldots, m$$

where $x_i$ represents the value of the i-th node of the input layer, $w_{ij}$ represents the connection weight from the i-th node of the input layer to the j-th node of the output layer, n is the number of nodes of the input layer, and $b_j$ represents the offset of the j-th node of the output layer.

The artificial neural network can be trained by using a BP (Back Propagation) algorithm. The collaborative classification model is obtained after comprehensively learning the preliminary classification information of various samples, and can effectively use the preliminary classification information of various samples to complete more accurate pedestrian detection tasks. In the online test, only input the test data set in the trained collaborative classification model for classification, to obtain the pedestrian sample classification of the test data set.

In order to facilitate experimental verification, a United Deep Model (UDN) is adopted in the following embodiment as a sub-classifier for the Collaborative Deep Network model selected in the present invention, and tested on the Caltech pedestrian database and the ETH pedestrian database respectively (The original database is used as the original training sample data set. The image in the original database is first preprocessed to obtain a rectangular candidate frame image for training). The UDN model successfully integrates feature extraction, deformation processing, occlusion processing and classification into a CNN model, effectively solving the problems such as pedestrian deformation and occlusion.

Figure 2:
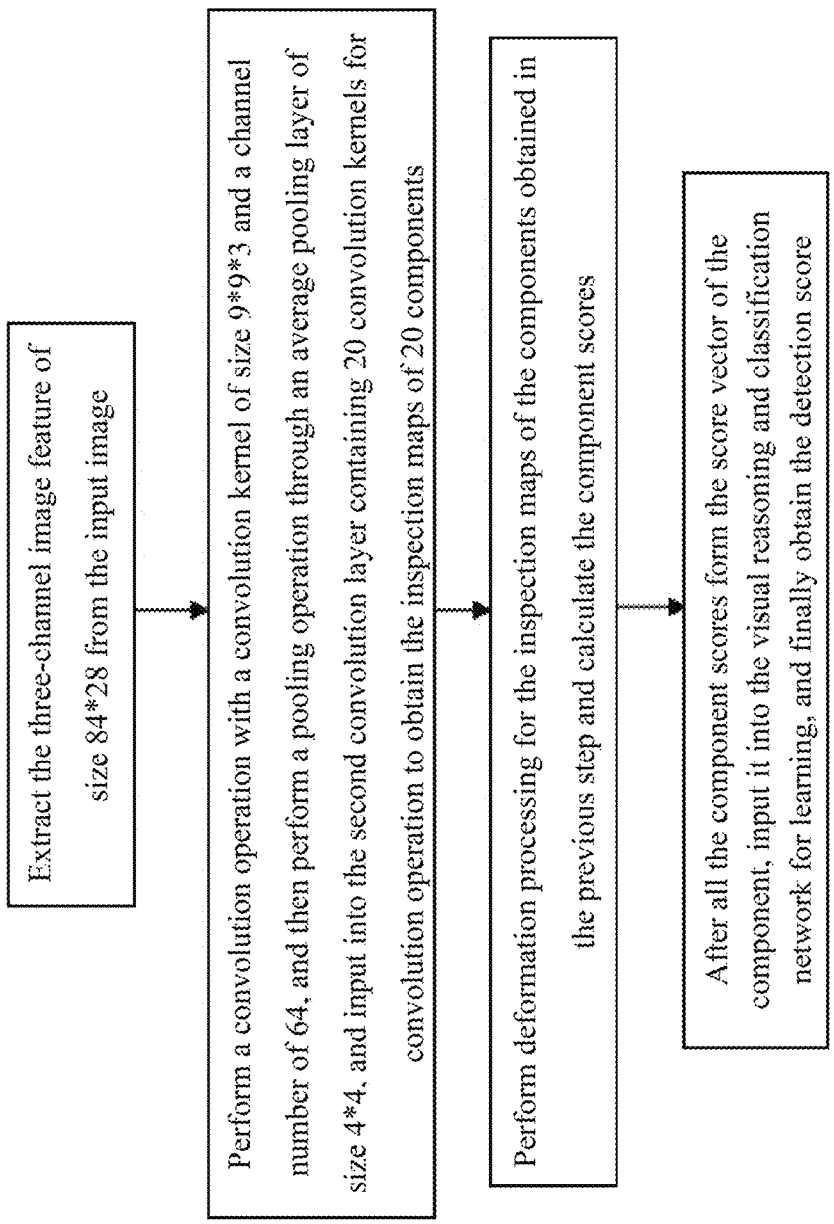
FIG. 2 illustrates a flowchart of a training process in which a United Deep Model is used as a sub-classifier in an embodiment of the present invention.

FIG. 2 illustrates a flowchart of a training process in which a UDN is used as a sub-classifier. An input picture is defined as three-channel image data of size 84×28, which is convoluted through 64 9×9×3 convolution kernels, and then subject to 4×4 pooling operation to obtain 64 19×5 feature maps. These feature maps are then input into the second convolutional layer, detection maps of 20 components are obtained through 20 convolution kernels designed to process deformation, then the detection scores of the components are calculated by the deformation layer, and finally they are sent to visual reasoning and the classification model for class estimation. The specific training process can include the following steps:

In the first step, transforming the original image into the YUV color space first, and then extracting the three-channel feature, wherein the first channel feature corresponds to the Y channel feature of the original image; the second channel feature is divided into four parts: an upper left corner, an upper right corner, a lower left corner, and a lower right corner. The upper left corner, the upper right corner, and the lower left corner respectively correspond to the feature maps of the Y, U, and V channels of the original image whose size is reduced to half of the original image, and the lower right corner is filled with 0; similarly, the third channel feature is also divided into four parts, reflecting the edge information of the original picture; the upper left corner, the upper right corner, and the lower left corner are the edge maps obtained by transforming the feature maps of the Y, U, and V channels of the original image through the Sobel operator and scaling the size. The lower right corner is composed of the pixel values having the largest amplitude at each of the above three edge maps.

In the second step, making two convolution transformations and one pooling operation of the input three-channel feature to obtain detection maps of 20 components;

In the training process, 20 convolution kernels are used in the embodiment of the present invention to calculate the detection maps of 20 components, which are feature maps of human body components.

In the third step, deforming the detection map of the component by Equation 4, and calculating the scores $s_p$ of all components:

$$B_p = M_p + \sum_{n=1}^{N} c_{np}D_{np} \quad (4)$$

$$s_p = \max_{(x,y)} b_p^{(x,y)}$$

where $M_p$ represents the detection map of the p-th component; $D_{np}$ and $c_{np}$ represent the n-th deformation map corresponding to the p-th component and its weigh; and $b_p^{(x,y)}$ corresponds to the element at position (x, y) in $B_p$;

The deformation map designed in this embodiment is a two-dimensional matrix having the same size as the component detection map, and the values in each matrix are between 0 and 255, including four types of matrix. The first and third types of matrix divide the matrix into six elongated strips arranged from left to right, and the values of each region are the same. The value of the left region is always greater than that of the right region, with the difference that the difference between the values of the first region is smaller, and the difference between the values of the third region is larger. The second and fourth types of matrix divide the matrix into six elongated strips arranged from top to bottom. The values of each region are the same. The difference is that the value of the upper region in the second type of matrix is greater than the value of the lower region, and in the fourth type, the value increased and then decreased from the top to the bottom. The preset values of the specific parameter in these deformation maps may not be fixed, and will be optimized in the training process.

In the fourth step, constituting the score vector of the components by the scores of all components, as in Equation 5; then using the component scoring vector to train the visual reasoning and classification network, and using the training method of standard BP algorithm; then completing training of the above sub-classifier, and obtaining the trained sub-classifier.

$$s=(s_p)_{p=1}^{20} \quad (5)$$

where in the United Deep Model, the visual reasoning and classification network is an artificial neural network. The input information received by each hidden layer in the network comes not only from the upper layer but also from the layer above the upper layer.

The experimental results show that CDN has better performance and detection effect than other more advanced algorithms in the field of pedestrian detection, which can effectively improve the classification ability of a single model; wherein other advanced algorithms in the field of pedestrian detection include HOG (Histogram of Oriented Gradient), HOGLBP (Histogram of Oriented Gradient and Local Binary Pattern), DPM (Deformable Part Models), DDM (Discriminative Deep Model), ICF (Integral Channel Features), CNN (Convolutional Neural Network), ACF (Aggregated Channel Features) and UDN (United Deep Model). The comparison results are shown in Table 1:

TABLE 1

Statistical table of experimental results of different pedestrian detection models

| Algorithm model | Average missing rate of Log | |
|---|---|---|
| | Caltech Test Set | ETH Data Set |
| HOG | 68% | 64% |
| HOGLBP | 68% | 55% |
| DPM | 63% | 51% |
| Discriminative Deep Model | 61% | 47% |
| ICF | 48% | 50% |
| CNN | 46% | — |
| ACF | 43% | 50% |
| UDN | 42.54% | 45.47% |
| CDN | 40.49% | 44.11% |

TABLE 2

Statistical table of experimental results of the CDN models with different designs on the Caltech Data Set

| | Average missing rate of Log |
|---|---|
| Clustering feature design | |
| CDN-RGB-based | 41.70% |
| CDN-ACF-based | 40.51% |
| CDN | 40.49% |
| Cluster number design | |
| CDN-6,6,6 | 42.40% |
| CDN-5,5,2 | 42.01% |
| CDN | 40.49% |
| Deep network design | |
| CDN-UDN + CNN | 42.07% |
| CDN-UDNs | 41.08% |
| CDN | 40.49% |
| Integrated mode design | |
| CDN-Max | 42.71% |
| CDN-3-layer Deep Neural Network | 41.99% |
| CDN-Mean | 41.88% |
| CDN | 40.49% |

Table 2 shows the detection effect of CDNs with different designs on the Caltech data set. It can be found that if CDN is clustered based on three-channel features and the number of clusters is 2. At the same time, by integrating United Deep Models trained by using the sub-training set obtained by clustering and the original training set respectively, and using the artificial neural network to integrate the results, the best detection performance will be obtained.

It is to be noted that the above contents are further detailed description of the present invention in connection with the disclosed embodiments. The invention is not limited to the embodiments referred to, but may be varied and modified by those skilled in the field without departing from the conception and scope of the present invention. The claimed scope of the present invention should be defined by the scope of the claims.

What is claimed is:

1. A method for building a collaborative deep network model for pedestrian detection, comprising:
   building a collaborative deep network model;
   training a plurality of deep network models in parallel by using different types of training data sets obtained by means of a clustering algorithm; and
   integrating and comprehensively analyzing, using an artificial neural network, classification results of an original data set by the plurality of deep network models, which achieves more accurate sample classification,
   the method further comprising:
   Step 1) using a re-sampling method based on a K-means clustering algorithm, and dividing the original training sample data set into different sub-sample sets by different features;
   Step 2) selecting a plurality of deep network models as sub-classifiers, and training the plurality of deep network models in parallel by using the sub-sample sets to obtain a plurality of trained sub-classifiers;
   Step 3) inputting the original training sample data set into the plurality of trained sub-classifiers at the same time to obtain detection scores, connecting the detection scores into detection score vectors, and training an artificial neural network by using the detection score vectors, to obtain a trained collaborative deep network model,
   wherein the feed forward model of the artificial neural network is based on Equation 3:

$$net_j = \sum_{i=1}^{i=n} w_{ij} x_i + b_j, j = 1, 2, \ldots, m \quad (3)$$

$$y_j = f(net_j), j = 1, 2, \ldots, m$$

where $x_i$ represents a value of the i-th node of an input layer, $w_{ij}$ represents a connection weight from an i-th node of the input layer to a j-th node of an output layer, n is number of nodes of the input layer, and $b_j$ represents an offset of the j-th node of the output layer, wherein the artificial neural network is trained by using a back propagation algorithm; and
   Step 4) inputting a test data set in the trained collaborative deep network model to classify the pedestrian samples, and obtaining the pedestrian sample classification.

2. The method for building a collaborative deep network model according to claim 1, wherein in Step 1), the re-sampling method based on a K-means clustering algorithm uses the K-means clustering algorithm to automatically segment the original training sample data set, to obtain a plurality of training sub-sample sets with different features by re-sampling, so that the differences between the training sub-sample sets are large and the differences within the training sub-sample sets are small,
   the method further comprising:
   Step 11) extracting the feature vector $X=\{x_i\}_{i=1}^{n}$, for each sample in the original training sample data set D, wherein n is the total number of samples;
   Step 12) randomly selecting the feature vector of k samples as the cluster center, and recording as $\{c_j\}_{j=1}^{k}$;
   Step 13) calculating the distance $d_{ij}$ between each feature vector and each cluster center by Equation 1:

$$d_{ij} = \|x_i - c_j\|_2 \quad (1)$$

where $x_i$ is the feature vector of each sample in the original training sample set D; and $c_j$ is the cluster center;
   Step 14) for each feature vector $x_i$, according to its distance from each cluster center, classifying the feature vector to the class in which the center vector closest to each other is located;

Step 15) updating the center vector of each class using Equation 2:

$$c_j = \frac{1}{|C_j|} \sum_{i \in C_j} x_i \quad (2)$$

$$C_j = \{i \mid \forall\, m \neq j,\, d_{im} > d_{ij}\}$$

where $C_j$ represents labels of all samples contained in each class; and

Step 16) stopping the clustering process when $C_j$ no longer changes, and getting different sub-sample sets; otherwise return to Step 13).

3. The method for building a collaborative deep network model according to claim 1, wherein the feature vector has a three-channel feature, each sample corresponds to three feature vectors, and the original training sample is clustered with each feature vector of the three channels respectively; and the model initialization value of the classification number k in Step 12) is set as 2, indicating that the corresponding sample contains attributes of both pedestrian and non-pedestrian.

4. The method for building a collaborative deep network model according to claim 1, wherein in Step 2), the deep network model as the sub-classifier comprises a basic deep network model, a strong deep learning detector, and a strong deep learning detector trained with weak training samples.

5. The method for building a collaborative deep network model according to claim 4, wherein the basic deep network model comprises a convolutional neuron network model and a perceptron model; and the strong deep learning detector comprises a United Deep Model.

6. The method for building a collaborative deep network model according to claim 1, wherein in Step 2), the United Deep Model is chosen as a sub-classifier, and the original training sample data set adopts the original image in the Caltech pedestrian database and the ETH pedestrian database, wherein the training process for the sub-classifier comprises:

in a first step, transforming the original image into the YUV color space first, and extracting the three-channel feature;

in a second step, inputting the obtained three-channel feature into the United Deep Model, and making two convolution transformations and one pooling operation of the input three-channel feature is subject to obtain a plurality of component detection maps;

in a third step, deforming the detection map of the component by Equation 4, and calculating the scores $s_p$ of all components:

$$B_p = M_p + \sum_{n=1}^{N} c_{np} D_{np} \quad (4)$$

$$s_p = \max_{(x,y)} b_p^{(x,y)}$$

where $M_p$ represents the detection map of the p-th component; $D_{np}$ and $c_{np}$ represent the n-th deformation map corresponding to the p-th component and its weigh; and $b_p^{(x,y)}$ corresponds to the element at position (x, y) in $B_p$; and in a fourth step, forming the scores of all components into a score vector of the components by Equation 5:

$$s = (s_p)_{p=1}^{20} \quad (5)$$

wherein the scoring vector of the component is used to train the visual reasoning and classification network, then training of the above sub-classifier is completed, and the trained sub-classifier is obtained.

7. The method for building a collaborative deep network model to claim 6, wherein for the three-channel feature in the first step, the first channel feature corresponds to the Y channel feature of the original image, wherein the second channel feature is divided into four parts: an upper left corner, an upper right corner, a lower left corner, and a lower right corner, wherein the upper left corner, the upper right corner, and the lower left corner respectively correspond to the feature maps of the Y, U, and V channels of the original image whose size is reduced to half of the original image, and the lower right corner is filled with 0, wherein the third channel feature is divided into four parts, reflecting the edge information of the original picture, wherein the upper left corner, the upper right corner, and the lower left corner are the edge maps obtained by transforming the feature maps of the Y, U, and V channels of the original image through the Sobel operator and scaling the size, wherein the lower right corner is composed of the pixel values having the largest amplitude at each of the above three edge maps.

8. The method for building a collaborative deep network model according to claim 6, wherein twenty convolution kernels are used in the second step to calculate the detection maps of 20 components, which are feature maps of the components.

9. The method for building a collaborative deep network model according to claim 6, wherein the deformation map used in the third step is a two-dimensional matrix of the same size as the detection map of the component, and the values in each matrix are between 0 and 255.

* * * * *